United States Patent
Utsumi et al.

(10) Patent No.: US 6,908,028 B2
(45) Date of Patent: Jun. 21, 2005

(54) METHOD OF MANUFACTURING HONEYCOMB BODY

(75) Inventors: Toru Utsumi, Tokyo (JP); Takeshi Shinoda, Tokai (JP); Atsuhiko Imai, Tokyo (JP); Kazutoshi Iwami, Tokyo (JP); Masayuki Kasuya, Tokai (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/149,522

(22) PCT Filed: Sep. 6, 2001

(86) PCT No.: PCT/JP01/07749

§ 371 (c)(1),
(2), (4) Date: Jun. 10, 2002

(87) PCT Pub. No.: WO02/30566

PCT Pub. Date: Apr. 18, 2002

(65) Prior Publication Data

US 2003/0073561 A1 Apr. 17, 2003

(30) Foreign Application Priority Data

Oct. 10, 2000 (JP) ........................................ 2000-308928
Jul. 6, 2001 (JP) ........................................ 2001-205592

(51) Int. Cl.$^7$ .............................................. B23P 13/00
(52) U.S. Cl. ........................................ 228/258; 228/181
(58) Field of Search ................................ 228/258, 181, 228/215, 219, 221

(56) References Cited

U.S. PATENT DOCUMENTS

| | | | | |
|---|---|---|---|---|
| 5,082,167 A | * | 1/1992 | Sadano et al. | 228/258 |
| 5,316,997 A | * | 5/1994 | Toyoda et al. | 502/314 |
| 5,667,875 A | * | 9/1997 | Usui | 428/182 |
| 6,599,645 B2 | * | 7/2003 | Wittebrood | 428/654 |

FOREIGN PATENT DOCUMENTS

| | | |
|---|---|---|
| JP | 56-4373 | 1/1981 |
| JP | 2-273549 | 11/1990 |
| JP | 3-501363 | 3/1991 |
| JP | 3-77777 | 4/1991 |
| JP | 4-148016 | 5/1992 |
| JP | 5-96426 | 12/1993 |
| WO | WO 90/03842 | 4/1990 |
| WO | WO 95/30508 | 11/1995 |
| WO | WO 99/37433 | 7/1999 |

* cited by examiner

Primary Examiner—Kiley Stoner
Assistant Examiner—Len Tran
(74) Attorney, Agent, or Firm—Kenyon & Kenyon

(57) ABSTRACT

The present invention provides a method of manufacturing a honeycomb body (1) formed by winding a flat metal foil (3) and a corrugated metal foil (4) in layers and brazing them, capable of reducing the equipment cost of honeycomb body manufacturing facilities and conforming to the countermeasure against an engine misfire problem of the honeycomb body, without causing insufficient or excessive application of adhesive which is seen in the cases of adhesive application methods using rolls; and relates to a method of manufacturing a honeycomb body characterized by: applying an adhesive to the portions to be brazed of the flat or corrugated foil corresponding to a bonding portion (17) which is located at one or both ends of the honeycomb body and/or a bonding portion (18) inside the honeycomb body over a cross section which is located away from one or both ends thereof in the axial direction; then, winding the flat and corrugated foils in layers to form a honeycomb body; then, making the portion of one or both end faces of the honeycomb body corresponding to the bonding portion (16) over the full axial length of the honeycomb body outer layers contact the surface of a liquid binder and having the binder sucked up along contact lines (5) of the flat and corrugated foils; and, then, feeding a brazing filler metal in powder to the honeycomb body so as to have it deposited at the portions where the adhesive and binder have been deposited.

14 Claims, 15 Drawing Sheets

METHOD OF MANUFACTURING HONEYCOMB BODY

TECHNICAL FIELD

The present invention relates to a method of manufacturing a honeycomb body formed by winding a flat metal foil and a corrugated metal foil, one over the other, and brazing them, especially a metal honeycomb body used as a catalyst support for purifying automobile emission gas and the like.

BACKGROUND ART

A catalyst converter holding a catalyst is installed in an emission gas path of an internal combustion engine for the purpose of purifying the emission gas. A support holding a catalyst is used likewise also in a methanol reforming apparatus to generate hydrogen-rich gas by steam reforming of hydrocarbon compounds such as methanol, a CO removal apparatus to reform CO into $CO_2$ to remove it, and a hydrogen combustion apparatus to burn $H_2$ into $H_2O$ to remove it. A catalyst support is composed of many cells through which gas passes, and the wall surface of each of the cells is coated with a catalytic materials so as to have the gas passing through the cells contact with the catalytic materials in a large contact area.

Either a ceramic catalyst support or a metal catalyst support is used as a catalyst support for the above purposes. The metal catalyst support is manufactured by winding a flat foil and a corrugated foil of a heat resistant alloy of several tens micrometers in thickness in layers, one over the other, to form a cylindrical metal honeycomb body, and encasing the metal honeycomb body in a cylindrical metal jacket. The honeycomb body is turned into a catalyst support by forming a catalyst holding layer impregnated with a catalytic materials on the wall surfaces of the honeycomb body cells through which the gas passes. The contact lines of the flat and corrugated foils of the honeycomb body formed through winding the foils are bonded by brazing or a similar bonding method of making the honeycomb body a strong structure.

A catalyst support used for purifying automobile emission gas is subjected to a violent thermal load during acceleration or high speed cruising of a vehicle as a result of high temperature emission gas passing through it. On the other hand, when an engine is idling or it is stopped, emission gas of a comparatively low temperature passes through it. Thus, heat cycles from high temperatures to low temperatures are repeated on the catalyst support and, therefore, a high structural reliability to withstand severe thermal stress and fatigue is required as the honeycomb body composing the catalyst support.

When a catalyst support is subjected to heating and cooling, a large temperature difference takes place between the center portion and the peripheral portion of the honeycomb body constituting the support: when the center portion is heated to a temperature higher than that of the peripheral portion, the center portion expands and, as a result, the peripheral portion undergoes a compressive stress; and when the center portion is cooled to a temperature lower than that of the peripheral portion, on the other hand, the center portion contracts and the peripheral portion is subjected to a tensile stress. Thus a large thermal stress is imposed on the peripheral portion in either case.

As shown in FIG. 2(a), Japanese Patent No. 2732889 and Japanese Examined Patent Publication No. H5-45298 disclose, inventions to bond a flat foil 3 and a corrugated foil 4 along their contact lines at a bonding portion 16 over the full axial length of the honeycomb body outer layers 12 for the purpose of preventing the fracture of the honeycomb body against the large thermal stress generated near its periphery, and to bond the foils only at a part of the axial length of the honeycomb body inner layers 13 (the layers other than the outer layers 12), more specifically only at a bending portion 17 which is located at the gas inlet end of the honeycomb body, for the purpose of minimizing the generated thermal stress as much as possible. Japanese Patent No. 2512622 discloses, as shown in FIG. 2(b), a honeycomb body in which the flat and corrugated foils are bonded only at a part of the prescribed axial length of the honeycomb body (a bonding portion 18 inside the honeycomb body over a cross section) and the foils are bonded also in the axial direction at the portion of the outermost 5 layers or less (a bonding portion 16 over the full axial length of the honeycomb body outer layers) for the same purpose.

When an automobile engine misfires, unburned gas combusts at the midst of honeycomb body and the temperature of the foils inside the honeycomb body exceeds their melting point. In the case of the above inventions wherein the foils are bonded only at the gas inlet end of the honeycomb body excluding the outer layers of the honeycomb body as shown in FIG. 2(a), if the foils melt inside the honeycomb body as a result of the misfire, the foils may protrude from the honeycomb body. Japanese Registered Utility Model No. 2543636 discloses, as shown in FIG. 2(c), a metal catalyst support free from the problem of protrusion of the honeycomb body or the like, wherein the flat and corrugated foils are bonded not only at the bonding portion 17 which is located at the gas inlet end of the honeycomb body but also at another bonding portion 18 inside the honeycomb body over a cross section which is located away from both ends thereof in the axial direction, as well as at the bonding portion 16 over the full axial length of the honeycomb body outer layers for the purpose of supporting the foils by the bonding portion 18 over the cross section even when the foils melt inside the honeycomb body as a result of a misfire.

In the above inventions wherein the flat foil 3 and the corrugated foil 4 constituting the honeycomb body are brazed only at a part or parts along their contact lines, a brazing filler metal is deposited only at the portions to be brazed and then the honeycomb body is heated to a high temperature to have the filler metal melt to braze those deposited parts of the contact lines of the flat and corrugated foils.

As a method of depositing the brazing filler metal only to the selected portions of the flat and corrugated foils, Japanese Unexamined International Patent Application No. H3-501363 discloses a method of applying an adhesive or a binding material to the areas to be brazed of any one of the flat and corrugated foils before winding them, then wind them in layers and feed the brazing filler metal in powder into the wound support, for the purpose of depositing it at the areas where the adhesive has been applied.

As a method of applying an adhesive to the areas to be later brazed of a flat or corrugated foil, Japanese Unexamined Patent Publication No. S56-4373 discloses a method of supplying an adhesive from an adhesive storage tank to the surface of a roll and applying the adhesive to the surface of a flat or corrugated foil by way of the roll.

At the contact lines of the flat and corrugated foils in a honeycomb body, the foils contact each other forming very acute angles, and the ends of the contact lines are exposed at both end faces of the honeycomb body. When a liquid, having good wettability with a metal foil and low viscosity, comes in contact with a honeycomb body at one or both end faces, it is sucked up along the contact lines of the flat and corrugated foils by the capillary phenomenon. Japanese Patent No. 2548796 discloses a method of brazing a honeycomb body characterized by sucking up a liquid adhesive along the contact lines of the flat and corrugated foils taking advantage of the capillary phenomenon by making the honeycomb body contact the surface of the liquid adhesive at one or both of the axial end faces, and then supplying a brazing filler metal in powder to have it deposited at the portions of the contact lines along which the adhesive has been sucked up. By this method, the adhesive is sucked up only along the contact lines of the flat and corrugated foils, it is not deposited at any other areas and, for this reason, the consumption of the brazing filler metal is controlled to the least and the problems such as corrosion by the brazing filler metal are avoided.

U.S. Pat. No. 5,082,167 discloses a method of sucking up an adhesive along the contact lines over the full axial length of the honeycomb body at outer layers by placing the honeycomb body on an annular base material holding the adhesive and, after that, of sucking up the adhesive to only one or both end portions of the honeycomb body by placing it on a cylindrical base material holding the adhesive and having an outer diameter equal to the inner diameter of the annular base material. According to this method, it is possible to braze the foils over the full axial length of the honeycomb body at outer layers and only at one or both end portions of the honeycomb body at inner layers by selecting the method of sucking up the adhesive.

A honeycomb body having a high structural reliability to withstand the thermal load and stress imposed on the catalyst support and being not broken in the event of an engine misfire can be manufactured by bonding the flat and corrugated foils over the full axial length of the honeycomb body at outer layers and also at an end of the honeycomb body at inner layers and/or a portion over a cross section of the honeycomb body at inner layers.

Another method of applying an adhesive to the wave tops of a corrugated foil before winding the flat and corrugated foils into a honeycomb body and then, after the winding, feed a brazing filler metal to the honeycomb body to have it deposited in the honeycomb body is also practiced. According to the method, the adhesive is applied to the wave tops of the corrugated foil by placing a pair of parallel rolls coated with the adhesive on their surfaces with a gap between them and making the corrugated foil pass through the gap and contact the roll surfaces only at the wave tops. By this method, however, if the gap between the parallel rolls is only a little too large, some of the wave tops of the corrugated foil may fail to come in contact with the surface of either of the rolls, causing the failure of the brazing and the consequent deterioration of structural strength and reliability as a result of no brazing at such portions. If the gap is only a little too narrow, on the other hand, the adhesive is applied to the wave tops of the corrugated foil over excessively large areas and the brazing filler metal in powder is deposited at all the areas covered with the adhesive. For this reason, the consumption of the filler metal becomes large and the metal foils constituting the honeycomb body are alloyed over a large area with the metal contained in the brazing filler material. This is undesirable since the alloying deteriorates mechanical properties of the foil.

A corrugated foil used for a honeycomb body is manufactured by applying plastic corrugation work to a flat foil. As a result of the plastic work, the surface of the corrugated foil may bend: for example, the wave tops may bend in the direction of foil width. In case of employing the abovementioned method of applying the adhesive to the wave tops of a corrugated foil at the bonding portion over the full axial length of the honeycomb body outer layers using a pair of parallel rolls, if the adhesive is applied to such bent corrugated foil, the adhesive application on the concave side of the bending of the corrugated foil will be insufficient in the width center portion of the foil and too much at both the edges of the foil. On the convex side of the bending of the corrugated foil, on the contrary, the adhesive application will be too much at the width center portion of the foil and too little at both the edges.

Since an adhesive has to be applied to the foil over the full axial length of the honeycomb body at outer layer, it is necessary to prepare adhesive applicator rolls for this purpose. Further, since the adhesive has to be applied to one or both ends of the honeycomb body at inner layer and/or to a portion over a cross section of the honeycomb body inner layers, it is necessary to prepare another adhesive applicator rolls for these purposes. As a consequence, as long as a method of applying the adhesive using the applicator rolls is employed, plural sets of the applicator rolls are required and this has been a reason why the equipment cost of honeycomb body manufacturing facilities are high.

By the method of sucking up the adhesive from one or both ends of a honeycomb body, however, it has been impossible to apply the adhesive selectively to a bonding portion over a cross section of the honeycomb body inner layers. Therefore, it has been impossible to employ the method of sucking up an adhesive for manufacturing a honeycomb body conforming to the countermeasure against an engine misfire.

DISCLOSURE OF THE INVENTION

The object of the present invention is to provide a method of manufacturing a honeycomb body, free from the insufficient or excessive application of an adhesive which is seen in the cases of adhesive application methods using rolls, capable of reducing the equipment cost of facilities for manufacturing honeycomb body and conforming to the countermeasure against an engine misfire problem of the honeycomb body, in a method of manufacturing a honeycomb body wherein a flat metal foil and a corrugated metal foil are wound in layers, one over the other, and brazed at the outermost layer or more of the honeycomb body over the full axial length and at one or both ends of the honeycomb body and/or at another portion inside the honeycomb body over a cross section which is located away from one or both ends thereof in the axial direction.

The gist of the present invention, therefore, is as follows:

(1) A method of manufacturing a honeycomb body 1 formed by winding a flat metal foil 3 and a corrugated metal foil 4 in layers and brazing them at the bonding portion 16 over the full axial length of the honeycomb body outer layers, at a bonding portion 17 which is located at one or both ends of the honeycomb body, and/or at a bonding portion 18 inside the honeycomb body over a cross section which is located away from one or both ends thereof in the axial direction, characterized by:

(a) applying an adhesive 26 to the portions to be brazed of the flat or corrugated foil corresponding to the bonding portion 17 which is located at one or both ends of the honeycomb body and/or the bonding portion 18 inside the honeycomb body over a cross sect on which is located away from one or both ends thereof in the axial direction;

(b) then, winding the flat and corrugated foils in layers to form a honeycomb body;

(c) then, depositing a liquid adhesive 33 at the portion of the honeycomb body corresponding to the bonding portion 16 over the full axial length of the honeycomb body outer layers by making the portion of one or both end faces of the honeycomb body corresponding to the bonding portion 16 over the full axial length of the honeycomb body outer layers contact the surface of the liquid adhesive 33 and having the adhesive 33 sucked up along contact lines 5 of the flat and corrugated foils; and d) then, feeding a brazing filler metal in powder to the honeycomb body so as to have it deposited at the portions where the adhesives (26 and 33) have been applied or deposited.

(2) A method of manufacturing a honeycomb body according to the item (1), characterized in that the bonding portion 16 over the full axial length of the honeycomb body outer layers covers ⅓ or less of the radius of the honeycomb body from its outermost layer toward the center thereof.

(3) A method of manufacturing a honeycomb body according to the item (1) or (2), characterized in that the portions of the flat foil 3 or the corrugated foil 4 to which the adhesive 26 is applied are the portions corresponding to the wave tops 6 of the corrugated foil 4.

(4) A method of manufacturing a honeycomb body according to any one of the items (1) to (3), characterized by applying the adhesive 26 to the portions of the flat foil 3 or the corrugated foil 4 by making rolls covered with the adhesive 26 on the surfaces contact the flat or corrugated foil.

(5) A method of manufacturing a honeycomb body according to any one of the items (1) to (4), characterized by depositing the liquid adhesive 33 at the portion of the honeycomb body corresponding to the bonding portion 16 over the full axial length of the honeycomb body outer layers by making a porous body 31 impregnated with the liquid adhesive 33 contact the portion of one or both end faces of the honeycomb body corresponding to the bonding portion 16 over the full axial length of the honeycomb body outer layers and, thus, having the adhesive 33 sucked up along the contact lines 5 of the flat and corrugated foils.

(6) A method of manufacturing a honeycomb body according to the item (5), characterized in that the porous body 31 has an annular shape.

(7) A method of manufacturing a honeycomb body according to any one of the items (1) to (6), characterized in that the viscosity of the liquid adhesive 33 to be sucked up to the honeycomb body is lower than that of the adhesive 26 to be applied by rolls.

(8) A method of manufacturing a honeycomb body formed by winding a flat metal foil 3 and a corrugated metal foil 4 in layers and brazing them at the bonding portion 20 over the full axial length of the honeycomb body outer layers, at a bonding portion 17 which is located at one or both ends of the honeycomb body, and/or at a bonding portion 18 inside the honeycomb body over a cross section which is located away from one or both ends thereof in the axial direction, characterized by:

(a) applying an adhesive 26 to the portions to be brazed of the flat or corrugated foil corresponding to the bonding portion 18 inside the honeycomb body over a cross section which is located away from one or both ends thereof in the axial direction and to the portion 20a excluding the portion which is located at the gas inlet end of the honeycomb body from the bonding portion 20 over the full axial length of the honeycomb body outer layers;

(b) then, winding the flat foil 3 and the corrugated foil 4 in layers to form a honeycomb body;

(c) then, depositing a liquid adhesive 33 at the portion 20b which is located at the gas inlet end out of the bonding portion over the full axial length of the honeycomb body outer layers and the bonding portion 17 which is located at one or both ends of the honeycomb body, by making the gas inlet end face 9 of the honeycomb body adhere to the surface of the liquid adhesive 33 and having the adhesive 33 sucked up along contact lines 5 of the flat and corrugated foils; and (d) then, feeding a brazing filler metal in powder to the honeycomb body so as to have it deposited at the portions where the adhesives (26 and 33) have been applied or deposited.

(9) A method of manufacturing a honeycomb body according to the item (8), characterized in that the bonding portion 20 over the full axial length of the honeycomb body outer layers covers ⅓ or less of the radius of the honeycomb body from its outermost layer toward the center.

(10) A method of manufacturing a honeycomb body according to the item (8) or (9), characterized in that the portions of the flat foil 3 or the corrugated foil 4 to which the adhesive 26 is applied are the portions corresponding to the wave tops 6 of the corrugated foil 4.

(11) A method of manufacturing a honeycomb body according to any one of the items (8) to (10), characterized by applying the adhesive 26 to the portions of the flat foil 3 or the corrugated foil 4 by making rolls covered with the adhesive 26 on the surface contact the flat or corrugated foil.

(12) A method of manufacturing a honeycomb body according to any one of the items (8) to (11), characterized in that the viscosity of the liquid adhesive 33 to be sucked up to the honeycomb body is lower than that of the adhesive 26 to be applied by rolls.

(13) A method of manufacturing a honeycomb body according to any one of the items (1) to (12), characterized in that the flat foil 3 has corrugation 14 and the wave height of the corrugation 14 is smaller than the wave height of the corrugated foil 4.

BRIEF DESCRIPTION OF THE DRAWINGS

FIG. 15 comprises partial sectional views of honeycomb bodies in the cases that flat foils are corrugated.

BEST MODE FOR CARRYING OUT THE INVENTION

Figure 1:
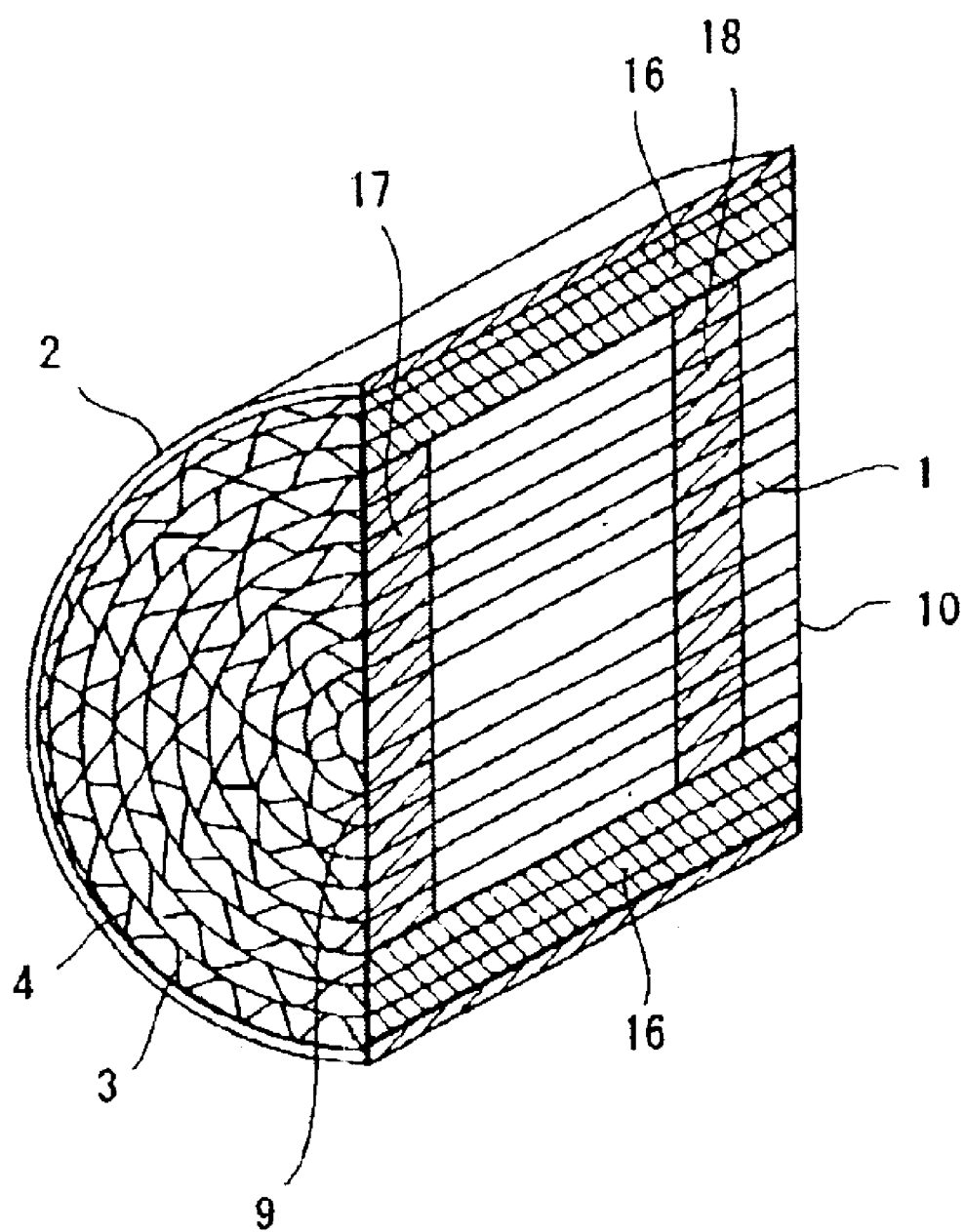
FIG. 1 is a perspective view partly in section of a honeycomb body according to the present invention encased in a cylindrical metal jacket.

The subject of the present invention is a honeycomb body 1 formed by winding a flat metal foil 3 and a corrugated metal foil 4 in layers, one over the other, and brazing them. The honeycomb body 1 includes a honeycomb body of a cylindrical shape formed by winding a flat foil 3 and a corrugated foil 4 in layers around a shaft, and another having a sectional shape in the form of a racetrack formed by winding a flat foil and a corrugated foil in layers leaving a hollow shaft at the center and then closing the hollow shaft by pressing.

The reason why the flat foil 3 and the corrugated foil 4 are wound in layers is that a cell formed between the flat foil and the corrugated foil in one wavelength by winding the foils in layers is used as a path of emission gas from a automobile engine. Since the purpose of the winding is to form the cells, it is not imperative that the flat foil 3 should be dead flat and, for this reason, as described in the item (13) of the present invention, a foil having corrugation 14 can, of course, be used also as the flat foil 3 according to the present invention.

Figure 2A:
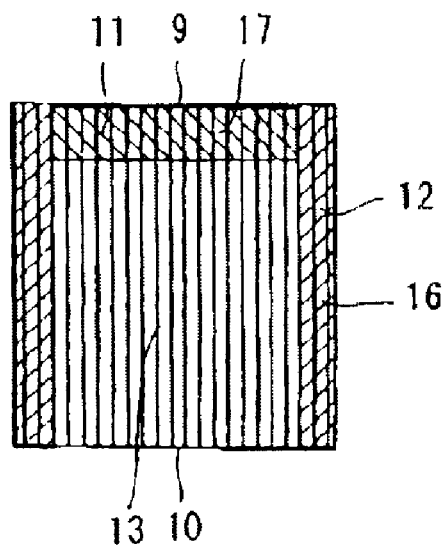
FIGS. 2(a), 2(b), 2(c) and 2(d) are sectional views of honeycomb bodies according to the present invention.
Figure 2B:
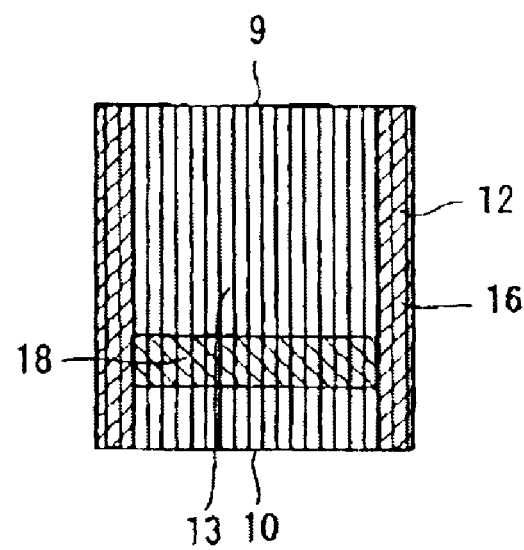
Figure 2C:
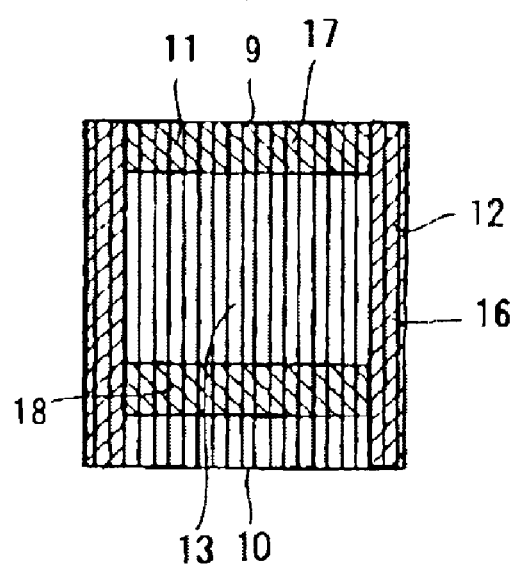
Figure 2D:
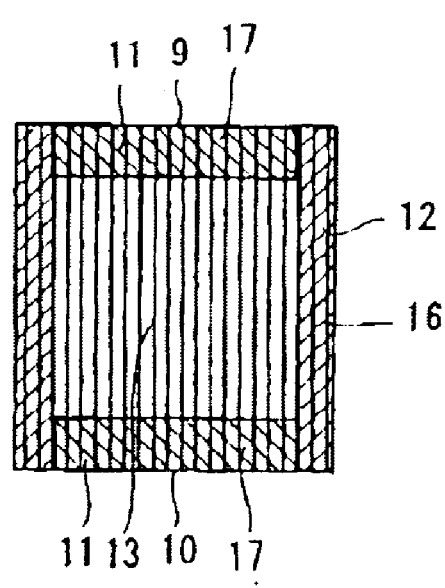

The brazed portions of the flat foil 3 and the corrugated foil 4 of the honeycomb body 1 are as follows: in the outer layers of the honeycomb body, the foils are bonded at the bonding portion 16 over the full axial length of the honeycomb body outer layers 12 covering the outermost layer of the foils or more; and in the inner layers 13 of the honeycomb body, that is the layers excluding the outer layers 12 (the layers where the foils are bonded over the full axial length), they are bonded at a bonding portion or bonding portions 17 at either of the ends (the gas inlet end, the gas outlet end or both ends) of the honeycomb body and/or a bonding portion 18 inside the honeycomb body over a cross section which is located away from one or both ends thereof in the axial direction. FIG. 2(a) shows a case that the foils are bonded at the bonding portion 16 over the full axial length of the honeycomb body outer layers and a bonding portion 17 which is located at the gas inlet end of the honeycomb body; FIG. 2(b) a case that the foils are bonded at the bonding portion 16 over the full axial length of the honeycomb body outer layers and a bonding portion 18 inside the honeycomb body over a cross section; FIG. 2(c) a case that they are bonded at the bonding portion 16 over the full axial length of the honeycomb body outer layers, a bonding portion 17 which is located at the gas inlet end of the honeycomb body and a bonding portion 18 inside the honeycomb body over a cross section; and FIG. 2(d) a case that they are bonded at the bonding portion 16 over the full axial length of the honeycomb body outer layers, a bonding portion 17 which is located at the gas inlet end of the honeycomb body and the other bonding portion 17 which is located at the gas outlet end.

In the outer layers 12 of the honeycomb body, the foils are bonded over the full axial length of the honeycomb body in order that the honeycomb body may withstand the large thermal stress imposed on the portion near its outer surface, and thus prevents its fracture. In the inner layers 13 (the layers excluding the outer layers 12) of the honeycomb body, the foils are bonded in an entire cross section at one or both ends of the honeycomb body and/or in a cross section inside it away from one or both ends in the axial direction. Since the honeycomb body is bonded in the inner layers 13 only at a part of the axial length, the thermal stress generated inside the honeycomb body can be reduced. When the honeycomb body has a bonding portion at the gas inlet end, the problem of bonded portions of the honeycomb body being broken apart in the event of an engine misfire can be prevented by bonding the foils over a cross section inside the honeycomb body or at the gas outlet end, in addition to the gas inlet end.

It is preferable that the bonding portion 16 over the full axial length of the honeycomb body outer layers covers $\frac{1}{3}$ or loss of the radius of the honeycomb body from its outermost layer toward the center as described in the item (2). If the radial thickness of the bonded portion over the full axial length exceeds $\frac{1}{3}$ of the 3D radius starting from the outer surface, it becomes impossible to sufficiently relax the thermal stress generated in the inner layers.

Figure 3:
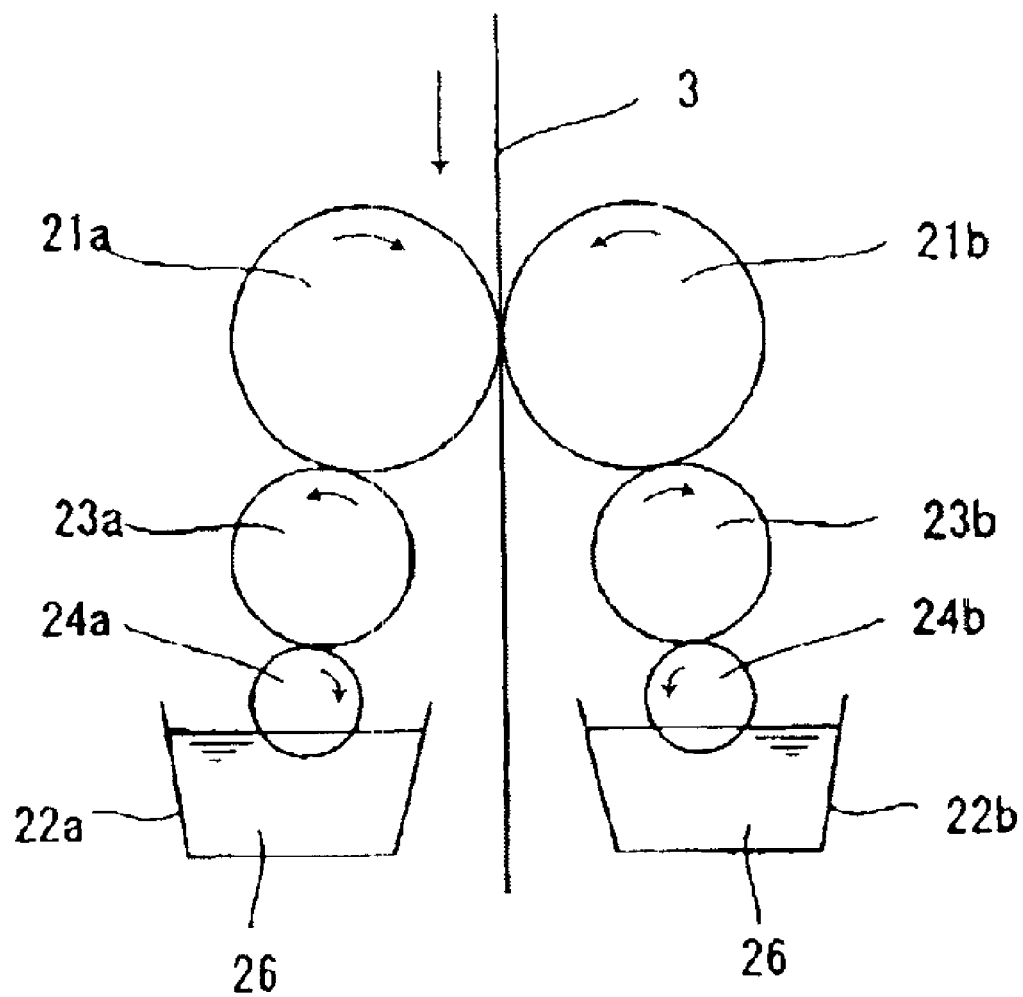
FIG. 3 is a side elevation view showing a manner of applying an adhesive to a flat foil using rolls according to the present invention.
Figure 4:
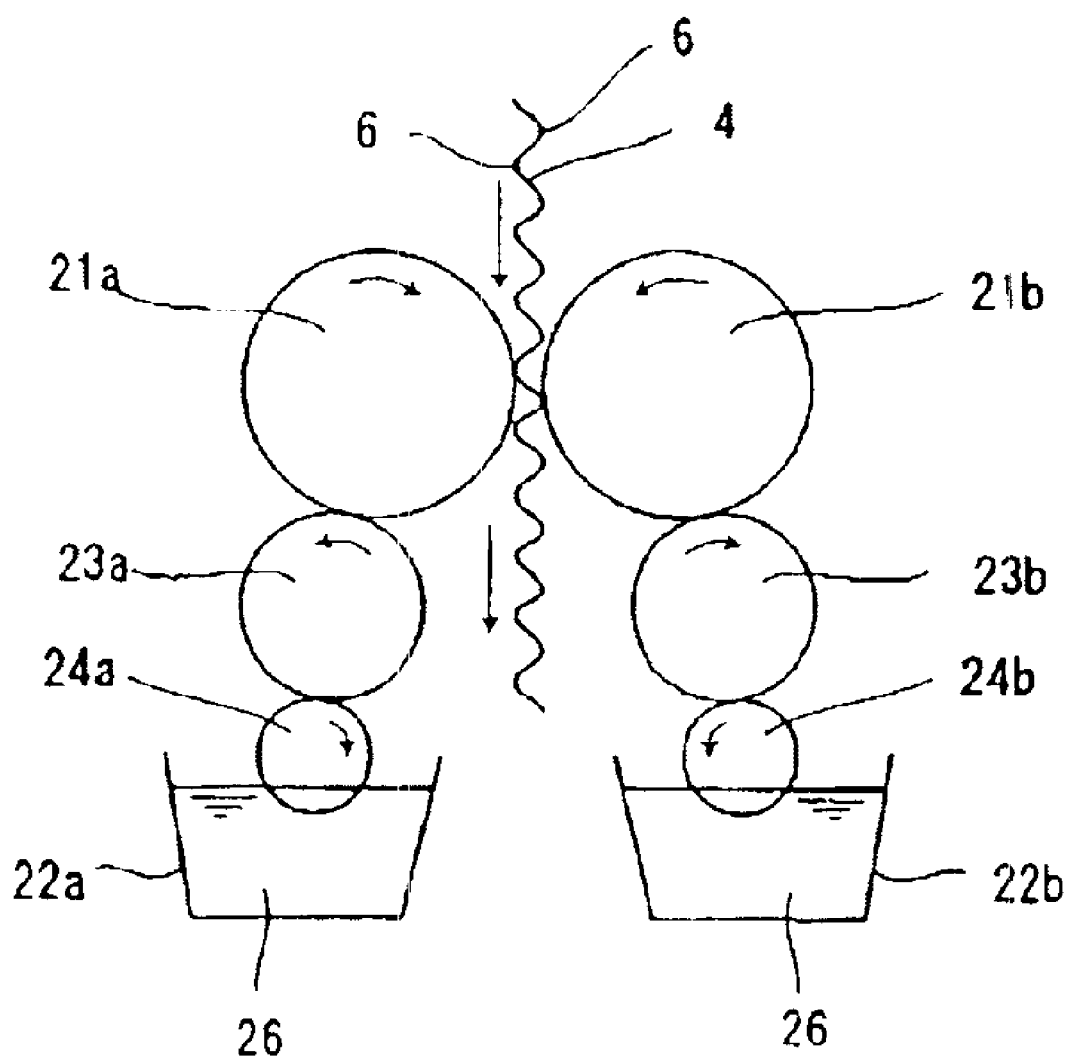
FIG. 4 is a side elevation view showing a manner of applying an adhesive to a corrugated foil using rolls according to the present invention.

For the brazing of the bonding portion(s) 17 at the end(s) (the gas inlet end, the gas outlet end or both ends) of the honeycomb body and the bonding portion 18 inside the honeycomb body over a cross section which is located away from one or both ends thereof in the axial direction, the adhesive 26 is applied to the areas to be brazed of either of the flat foil 3 and the corrugated foil 4, prior to winding them in layers. FIG. 3 shows a case of applying an adhesive 26 to a flat foil 3, and FIGS. 4 and 5 a case of applying an adhesive 26 to the wave tops 6 of a corrugated foil 4. In the case that the adhesive 26 is applied to a flat foil 3, however, the adhesive 26 may be applied to the areas not to be contacted with the corrugated foil, and to be coated later with the catalytic materials. These areas will then be covered with the brazing filler metal in powder and, as a consequence, an excessive amount of the brazing filler metal will be consumed. Besides, the foil material of the flat foil may be alloyed at the areas covered with the brazing filler metal by the elements contained in it, adversely affecting mechanical properties of the flat foil 3. On the other hand, in the case that the adhesive 26 is applied to the wave tops 6 of a corrugated foil 4 as described in the item (3) of the present invention, the adhesive 26 is applied to the corrugated foil only on the contact lines 5 with the flat foil and the brazing filler metal is deposited only on the contact lines 5 of the flat and corrugated foils, which is more preferable than the above case.

When applying the adhesive 26 to the surfaces of a flat foil 3 or a corrugated foil 4, it is preferable to do that by making rolls covered with the adhesive 26 on the surface contact the flat or corrugated foil as described in the item (4). An example of the application of the adhesive 26 to the wave tops 6 of a corrugated foil 4 is explained hereafter based on FIG. 4. A pair of adhesive applicator rolls (21a and 21b) is arranged in parallel to each other with a gap between them and the corrugated foil 4 is made to pass through the gap. An adhesive tank 22 is provided for each of the applicator rolls 21. In the example shown in FIG. 4, pairs of second rolls 23 and third rolls 24 are equipped between the adhesive tanks 22 and the adhesive applicator rolls 21, and these rolls rotate as the applicator rolls 21 do. The third rolls 24 are partially immersed in the adhesive 26 in the adhesive tanks 22 and the adhesive 26 covers the surfaces of the third rolls as they rotate. The adhesive 26 on the surfaces of the third rolls is transferred onto the surfaces of the second rolls as they rotate, and then the adhesive 26 on the surfaces of the second rolls is transferred onto the surfaces of the adhesive applicator rolls, to be finally transferred from the surfaces of the adhesive applicator rolls onto the wave tops 6 of the corrugated foil passing between them. The second rolls 23 and the third rolls 24 can be omitted as the case may be. The pairs of the adhesive applicator rolls, second rolls, third rolls, confronting each other, and adhesive tanks constitute an adhesive application apparatus 25.

Figure 5:
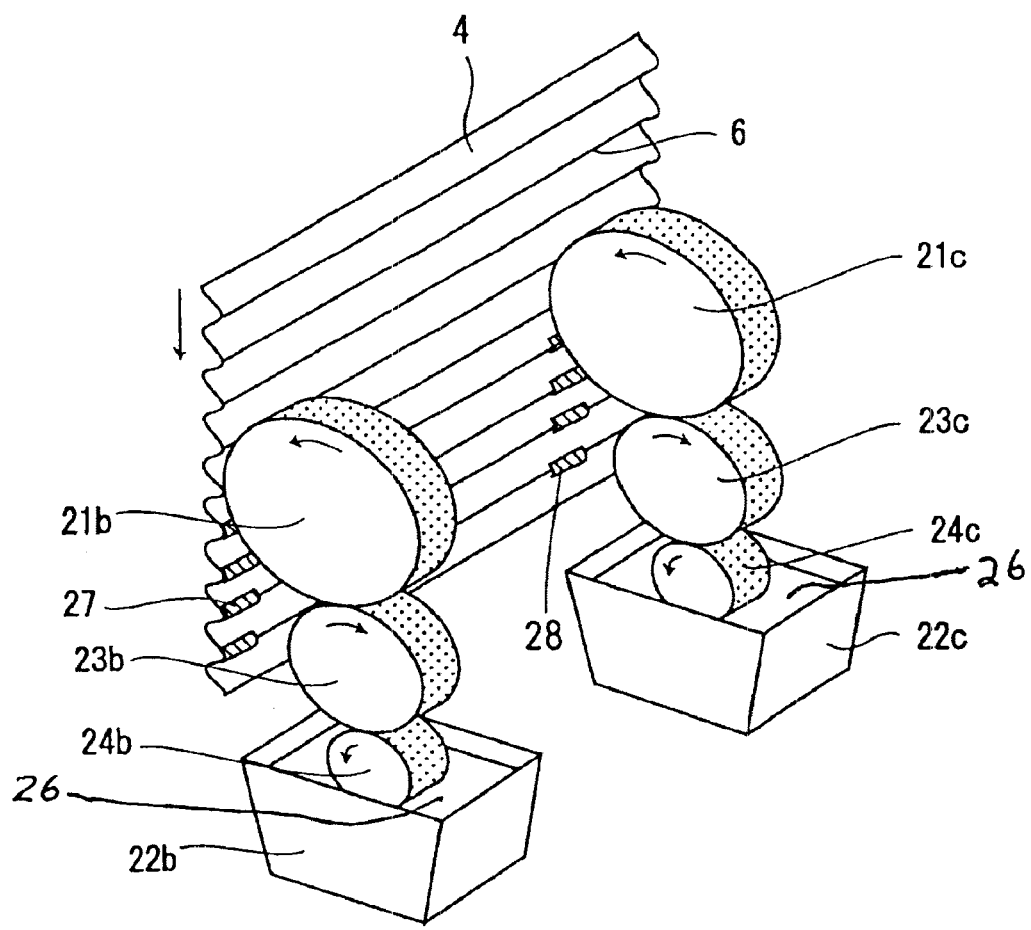
FIG. 5 is a perspective view showing a manner of applying an adhesive to a corrugated foil using rolls according to the present invention.

Explained hereinafter, based on FIG. 5, is a case of applying an adhesive 26 to the wave tops 6 corresponding to two bonding portions, namely the bonding portion 17 at the gas inlet end of the honeycomb body and the bonding portion 18 inside the honeycomb body over a cross section which is located away from one or both ends thereof in the axial direction. A pair of adhesive applicator rolls (21a and 21b) and the accompanying adhesive application apparatus are provided for applying the adhesive 26 to the width edge portions 27 of a corrugated foil corresponding to the bonding portion 17 at the end of the honeycomb body. Another pair of adhesive applicator rolls (21c and 21d) and the accompanying adhesive application apparatus are provided for applying the adhesive 26 to the inner portions 28 of the corrugated foil which is located away from the edges corresponding to the bonding portion 18 inside the honeycomb body over a cross section. Note that FIG. 5 does not show the rolls 21a and 21d.

Figure 6:
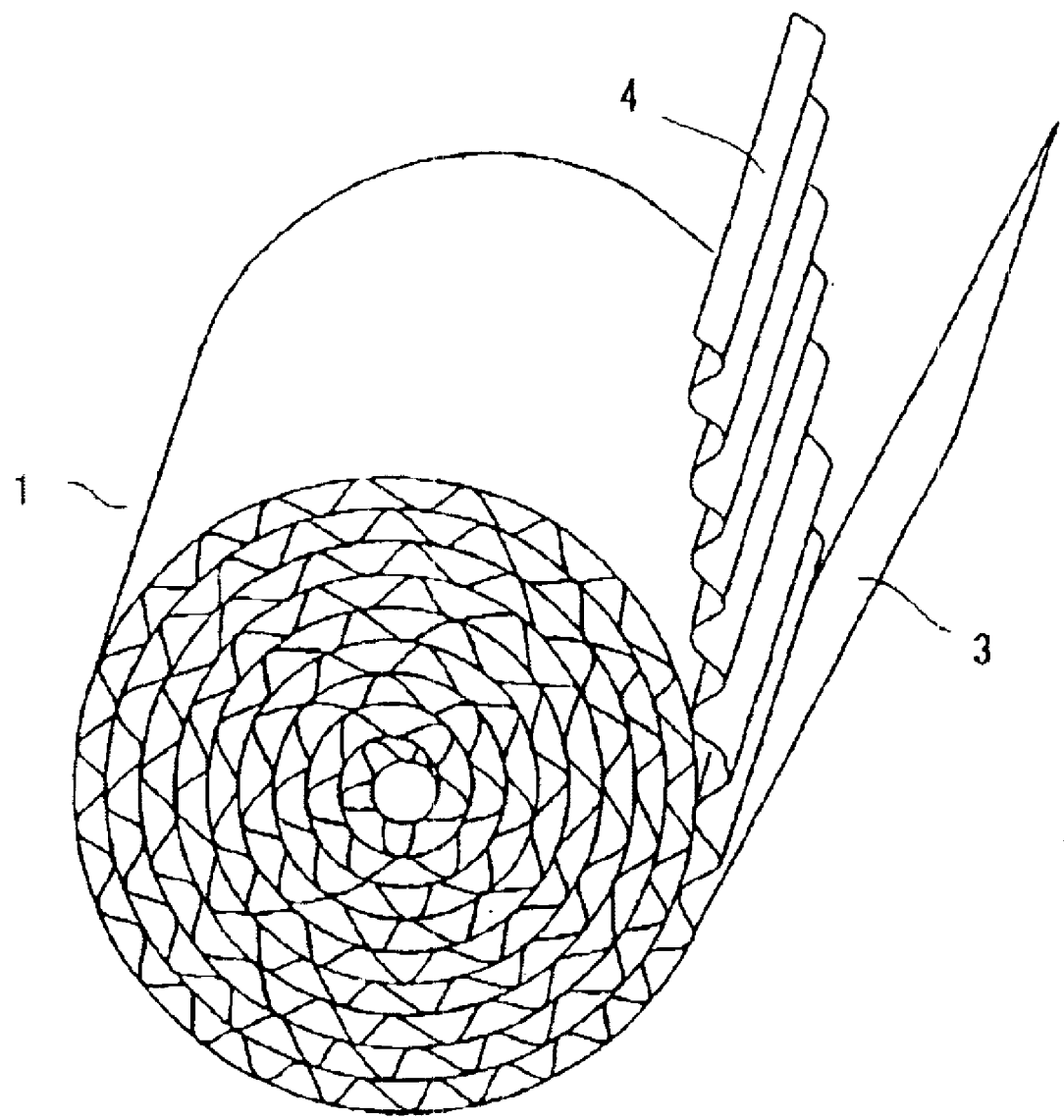
FIG. 6 is a perspective view showing a manner of winding flat and corrugated foils in layers to form a honeycomb body.

After the application of the adhesive 26 to the flat foil 3 or the corrugated foil 4, the flat foil 3 and the corrugated foil 4 are wound in layers, as shown in FIG. 6, to form the honeycomb body 1. The honeycomb body 1 may be encased in the cylindrical metal jacket 2 at this stage.

Figure 7:
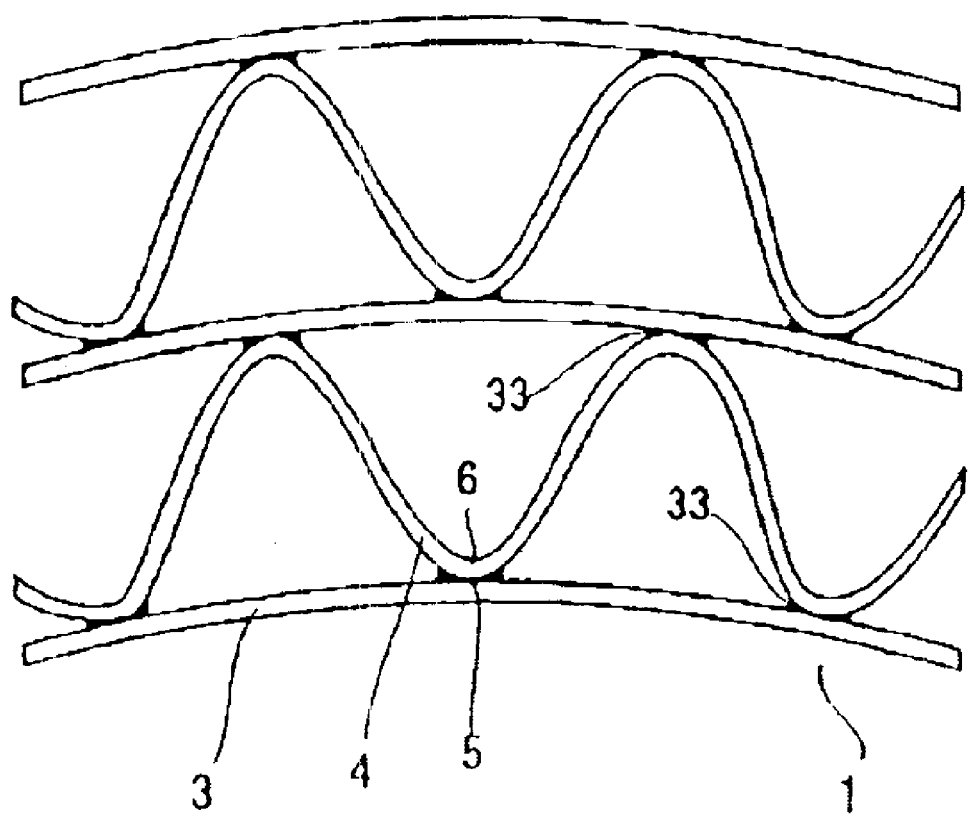
FIG. 7 is a sectional view showing the situation how an adhesive is deposited along the contact lines of flat and corrugated foils.

The method of sucking up the adhesive 33 is employed for the bonding portion 16 over the full axial length of the honeycomb body outer layers. The honeycomb body 1 formed by winding the flat and corrugated foils is placed to come in contact with the surface of the liquid adhesive 33 at a part of one of its end faces. The part of the honeycomb body to contact the surface of the liquid adhesive 33 is the part of one of its end faces corresponding to the bonding portion 16 over the full axial length of the honeycomb body outer layers. Since the ends of the contact lines 5 of the flat and corrugated foils are exposed at the end faces of the honeycomb body, the adhesive 33 contacts the contact lines. Owing to the very acute angles at which the flat and corrugated foils contact each other, the adhesive 33 is sucked up along the contact lines 5 from the end in contact with the liquid adhesive 33 over the full axial length of the honeycomb body to the other end by the capillary phenomenon. Thus the adhesive 33 is deposited all along the contact lines 5 of the flat foil 3 and the corrugated foil 4 of the honeycomb body as shown in FIG. 7.

By the method of sucking up the adhesive 33 described above employed for the bonding portion 16 over the full axial length of the honeycomb body outer layers, different from the conventional method of applying the adhesive to the wave tops of the corrugated foil using a pair of parallel rolls, the adhesive is deposited evenly along the contact lines and, consequently, the consumption of the brazing filler metal is reduced and the alloyed parts of the foils forming the honeycomb body are minimized. Further, even when the surface of the corrugated foil is bent before it is wound, the flat and corrugated foils contact each other tightly by elastic deformation of the foils once they are wound to form a honeycomb body, and, for this reason, the adhesive is evenly deposited along every contact line by the method of sucking up the adhesive according to the present invention, eliminating inappropriate adhesive application as seen in the cases of the adhesive application methods using the rolls.

The contact of the honeycomb body with the liquid adhesive 33 at one or both end faces has to be limited to the outer layers 12 of the honeycomb body where the flat and corrugated foils have to be bonded all through the axial length of the honeycomb body. According to the item (5) of the present invention, it is possible to deposit the adhesive 33 at the contact lines of the flat and corrugated foils by sucking it up along the contact lines by impregnating a porous body 31 with the adhesive 33 and making it contact the area of one or both end faces of the honeycomb body corresponding to the portion to be bonded over the full axial length of the honeycomb body. An elastic porous body such as a sponge or a cavernous body, a metal porous body, a ceramic porous body, etc. can be used as the porous body 31.

Figure 8A:
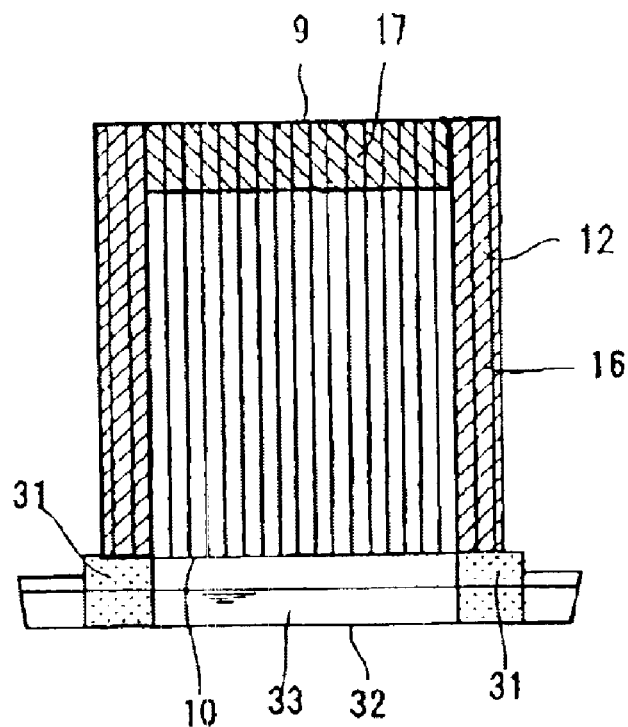
FIGS. 8(a) and 8(b) are illustrations showing a manner of having an adhesive sucked up to a honeycomb body.
Figure 8B:
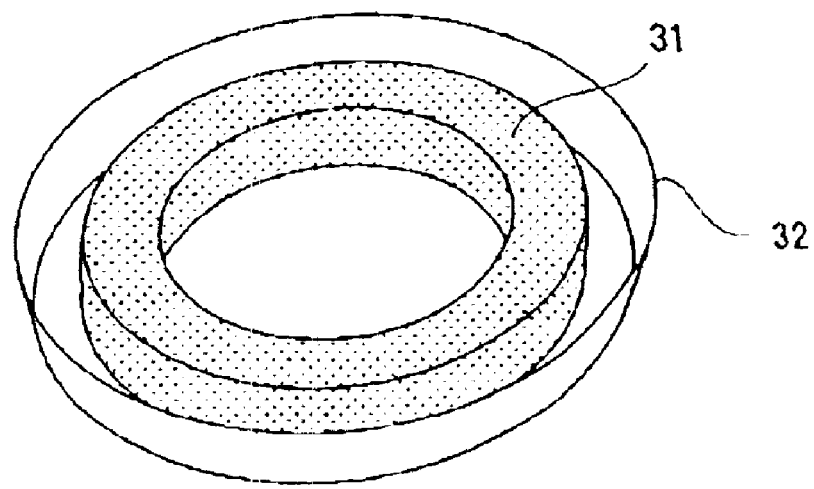

The adhesive can be deposited as described above, specifically, by forming the porous body 31 in a ring shape as shown in FIG. 8(b) and making the inner diameter of the ring equal to the diameter of the innermost layer of the bonding portion 16 of the outer layers of the honeycomb body, as described in the item (6). The outer diameter of the ring is set equal to or larger than the outer diameter of the honeycomb body 1. The ring-shaped porous body 31 is impregnated with the adhesive 33 by placing it in an adhesive tank 32. The honeycomb body 1 contacts the liquid adhesive 33 at one or both end faces by making it contact the porous body 31 coaxially as shown in FIG. 8(a). When the honeycomb body 1 has a sectional shape in the form of a racetrack, the porous body 31 is preferable to be of the racetrack shape accordingly.

Figure 9A:
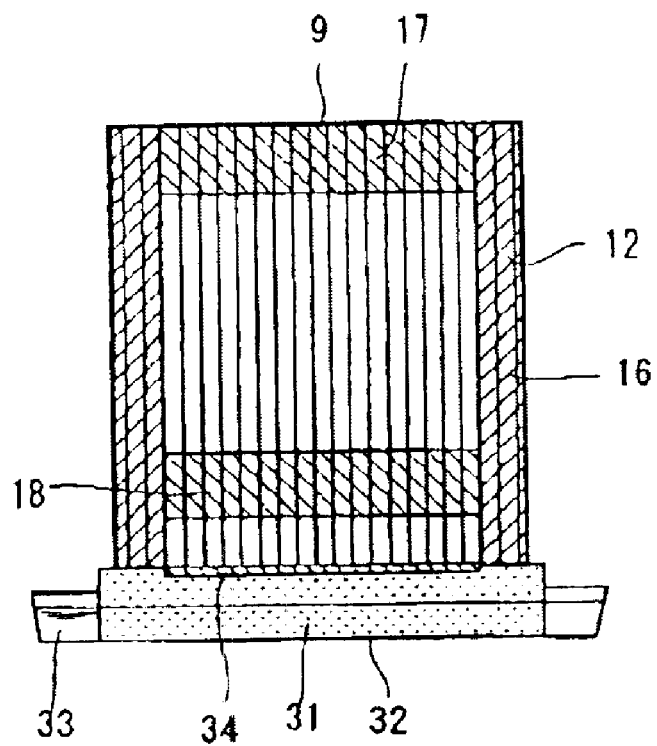
FIGS. 9(a) and 9(b) are illustrations showing a manner of having an adhesive sucked up to a honeycomb body.
Figure 9B:
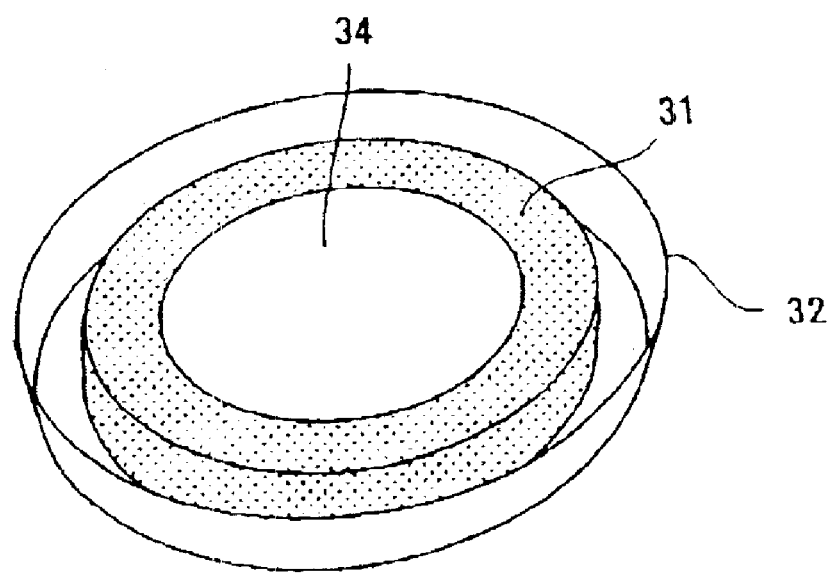

The porous body 31 may also be of a disc shape with a shield plate 34 placed on it as illustrated in FIG. 9. The outer diameter of the shield plate 34 is preferable to be equal to the diameter of the innermost layer of the bonding portion 16 of the outer layers of the honeycomb body. The honeycomb body 1 is placed on the porous body 31 coaxially with the shield plate 34. Since it will be only at the area outside the shield plate 34 that one or both end faces of the honeycomb body 1 contacts the porous body 31 by the above arrangement, only the area of one or both end faces of the honeycomb body corresponding to the bonding portion 16 over the full axial length of the honeycomb body outer layers will contact the liquid adhesive 33 permeating through the porous body.

When the shield plate is used, it is preferable to use an elastic porous body comprising of sponge, cavernous material or the like as the porous body 31 for realizing a good contact with the honeycomb body.

After applying the adhesives 26 and depositing the adhesives 33 at the portions of the honeycomb body to be brazed as explained above, the honeycomb body is fed with the brazing filler metal in powder, which is deposited only at the areas covered with the adhesives 26 and 33. The brazing filler metal in powder not caught by the adhesives is discharged from the honeycomb body.

The honeycomb body 1 may be encased in the cylindrical metal jacket 2 at any of the following stages: upon winding the flat and corrugated foils in layers into a honeycomb body, upon sucking up the adhesive 33 to the bonding portion, or upon depositing the brazing filler metal in powder.

The outer surface of the honeycomb body 1 is bonded to the inner surface of the cylindrical metal jacket 2 usually by attaching a foil of a brazing filler metal or depositing a brazing filler metal in powder. When the outermost foil of the honeycomb body 1 is the corrugated foil, the adhesive 33 may be deposited along the contact lines of the wave tops of the corrugated foil and the inner surface of the cylindrical metal jacket 2 by the method of sucking up the adhesive after inserting the honeycomb body 1 into the metal jacket 2.

Then, bonding of the honeycomb body is completed by brazing the bonding portions by charging the honeycomb body encased in the cylindrical metal jacket into a high temperature furnace to heat it and melting the brazing filler metal in powder deposited along the contact lines of the flat and corrugated foils.

A solution, for example, of polyvinyl alcohol is used as the liquid adhesive 33 in the method of sucking up the adhesive 33 according to the present invention. The better the wettability of the adhesive 33 with the surfaces of the metal foils, the better the sucking-up proceeds. The surface tension of the adhesive 33 can be controlled by adding a surface active agent to it as the case may be, and it is thus possible to control the condition to suck up the adhesive along the contact lines of the flat and corrugated foils. It has to be noted that the viscosity of the liquid adhesive 33 has to be within a suitable range lower than a prescribed value, because the adhesive 33 will not be sucked up smoothly if its viscosity is too high.

Polyvinyl alcohol or high molecular polymers, for example, may be used as the adhesive 26 to be applied partly to the edge portions or the portions away from the edges of the metal foil according to the present invention. If the adhesive 26 has too low a viscosity, it will spread by surface tension between the contact surfaces of the flat and corrugated foils when they are wound in layers. For this reason the adhesive 26 has to have a viscosity within a suitable range above a prescribed value.

In the present invention, the sucking-up of the liquid adhesive 33 is kept smooth and the adhesive 26 is prevented from spreading too much by making the viscosity of the liquid adhesive 33 lower than that of the adhesive 26 as described in the item (7).

When the adhesive 26 is applied to the flat or corrugated foil, if the adhesive 26 is applied also to the areas to be included in the bonding portion 16 over the full axial length of the honeycomb body outer layers, and if the adhesive 33 is sucked up thereafter, the adhesive 33 cannot be sucked up beyond the portions where the adhesive 26 has already been applied. When applying the adhesive 26, therefore, it is necessary not to apply it to the areas to be included in the bonding portion 16 over the full axial length of the honeycomb body outer layers.

FIG. 8 shows an example of a method of manufacturing a honeycomb body having the bonding portion 16 over the full axial length of the honeycomb body in its outer layers and the bonding portion 17 which is located at the gas inlet end of the honeycomb body, and FIG. 9 another to manufacture a honeycomb body having the bonding portion 16 over the full axial length of the honeycomb body outer layers, the bonding portion 17 which is located at the gas inlet end of the honeycomb body and a bonding portion 18 inside the honeycomb body over a cross section. In both the cases as shown in FIGS. 8 and 9, the adhesive 26 is applied to the areas of the foil corresponding to the bonding portion 17 which is located at the gas inlet end of the honeycomb body and the bonding portion 1B inside the honeycomb body over a cross section before winding the flat and corrugated foils, and the adhesive 33 is deposited at the bonding portion 16 over the full axial length of the honeycomb body by the method of sucking up the adhesive 33 after forming the flat and corrugated foils into a honeycomb body.

Figure 10A:
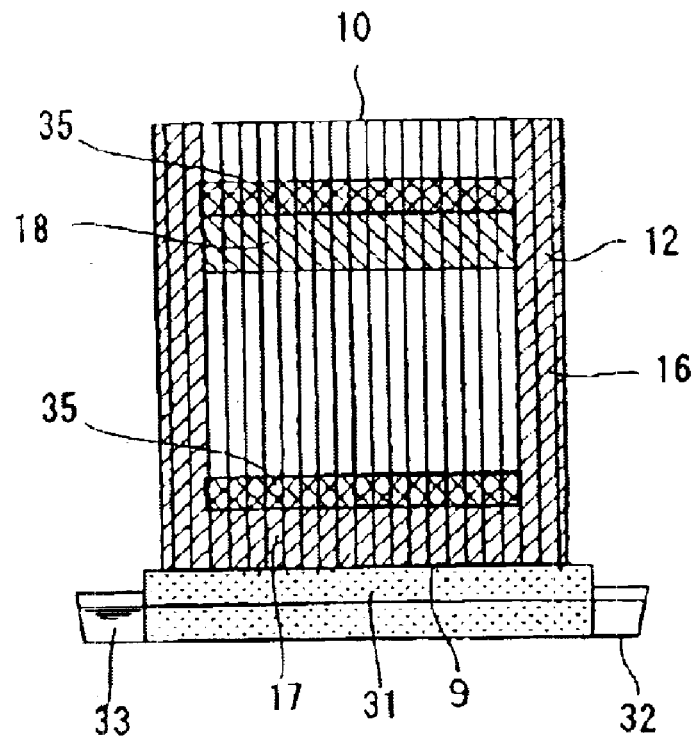
FIGS. 10(a) and 10(b) are illustrations showing a manner of having an adhesive sucked up to a honeycomb body.

It is also possible, however, to deposit the adhesive 33 at the bonding portion 17 which is located at one or both ends of the honeycomb body by the method of sucking up the adhesive 33. In the example shown in FIG. 10, the adhesive 26 is applied to the bonding portion 18 inside the honeycomb body over a cross section before winding the flat and corrugated foils and, besides, suck-up inhibitor coated zones 35 are provided on the surface of the flat foil 3 by applying an agent to prevent the sucking-up of the adhesive such as fat, grease, oil, etc. also before winding the foils. When the agent to prevent the sucking-up of the adhesive is applied to the flat foil 3, the adhesive 33 is not sucked up beyond the suck-up inhibitor coated zone 35 owing to poor wettability of the suck-up inhibitor coated zone 35 with the adhesive 33. When the whole gas inlet end face 9 of the honeycomb body 1 is made to contact the porous body 31 as shown in FIG. 10(a) after the above processing, the adhesive 33 is sucked up along the contact lines of the flat and corrugated foils in the whole section of the honeycomb body. Whereas, in the bonding portion 16 over the full axial length of the honeycomb body outer layers, the adhesive 33 is sucked up over the full axial length because no suck-up inhibitor coated zone 35 is provided in the bonding portion 16, the adhesive 33 is sucked up only within the end portion 17 of the honeycomb body in the inner layers 13 owing to the existence of the suck-up inhibitor coated zone 35. It is also possible to deposit the adhesive 33 in the bonding portions 17 at both the ends of the honeycomb body 1, by turning it upside down after the above step so as to make the gas outlet end face 10 contact the porous body at the inner layers as shown in FIG. 10(b).

The suck-up inhibitor coated zone 35, according to the present invention, is provided, in the axial direction, at the inside of, and contiguous to a portion to be formed as the bonding portion 17 which is located at one or both ends of honeycomb body.

Figure 10B:
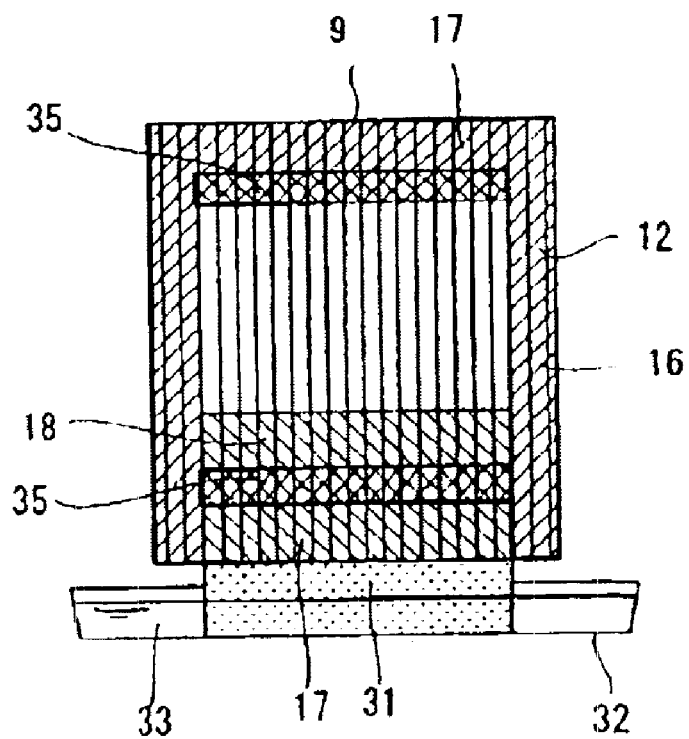

As shown in FIG. 10(a) and FIG. 10(b), for example, the suck-up inhibitor coated zones 35 are provided, in the axial direction, at the inside of, and contiguous to a portion to be formed as the bonding portion 17 which is located at the gas inlet end of honeycomb body and at the inside of, and contiguous to a portion to be formed as the bonding portion 17 which is located at the gas outlet end of honeycomb body.

Figure 13A:
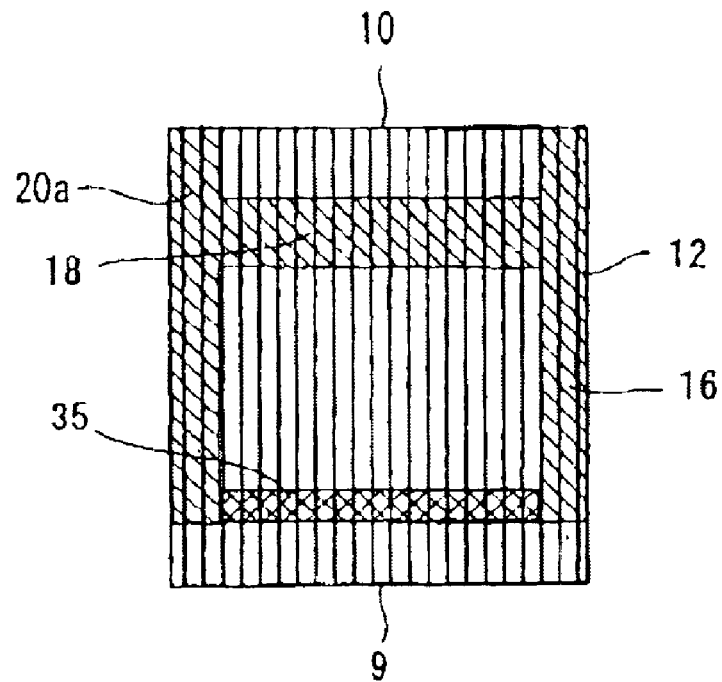
FIG. 13(a) shows the status before an adhesive is sucked up, and FIG. 13(b) the status after an adhesive is sucked up.
Figure 13B:
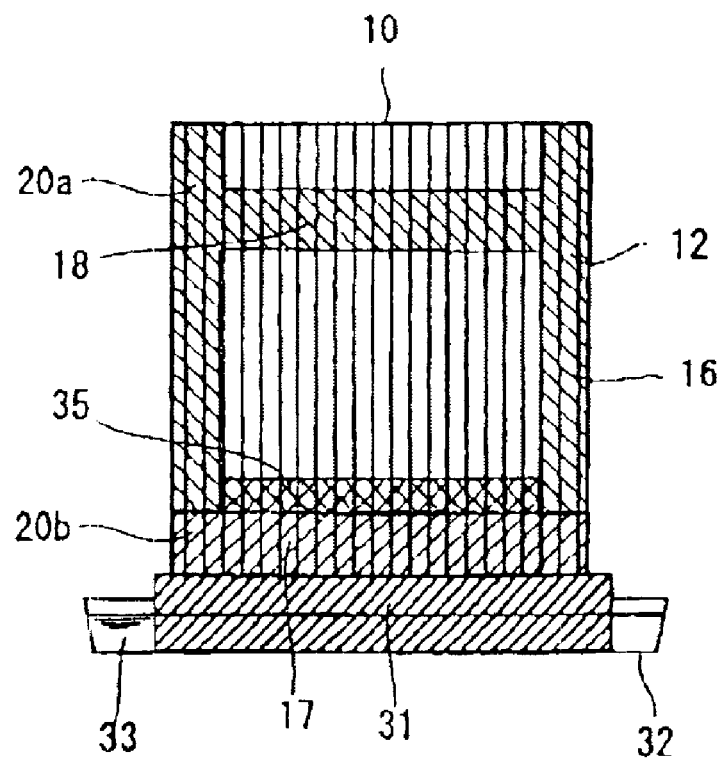
FIG. 13 comprises illustrations showing a manner of having an adhesive sucked up to a honeycomb body.
Figure 14A:
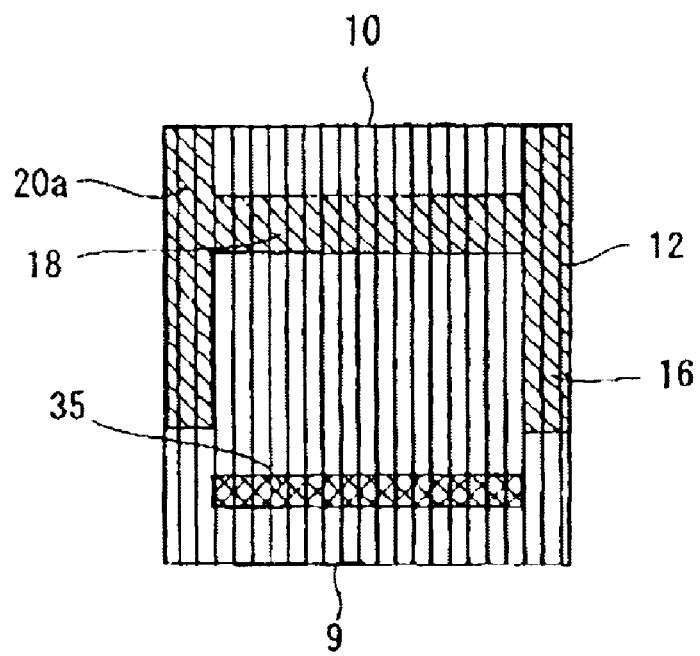
FIG. 14(a) shows the status before an adhesive is sucked up, and FIG. 14(b) the status after an adhesive is sucked up.
Figure 14B:
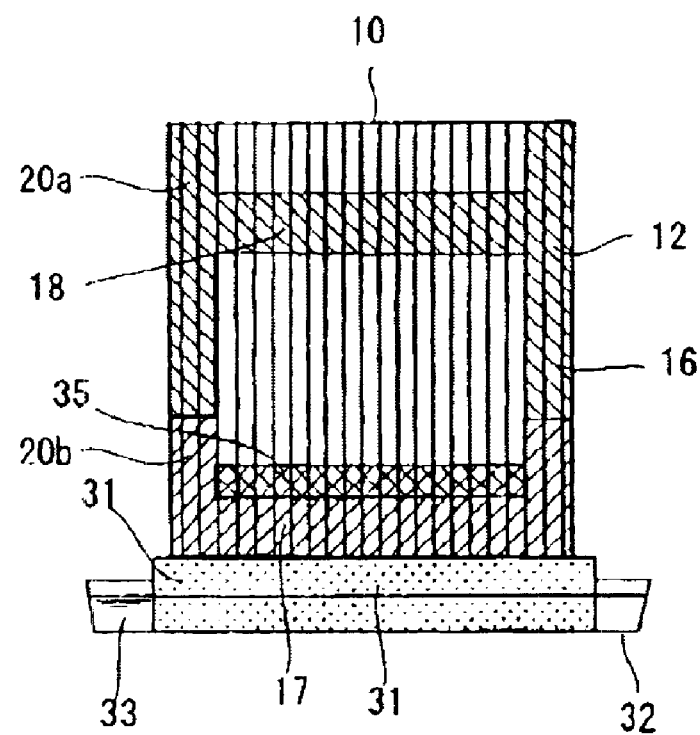
FIG. 14 comprises illustrations showing a manner of having an adhesive sucked up to a honeycomb body.

As shown in FIGS. 11, 13 and 14, explained hereinafter, the suck-up inhibitor coated zone 35 is provided, in the axial direction, at the inside of, and contiguous to a portion to be formed as the bonding portion 17 which is located at the gas inlet end of honeycomb body.

The suck-up inhibitor is coated on the surface of the flat foil 3 in the above examples, however, it can be coated on the surface of the corrugated foil 4 or both foils.

Figure 11A:
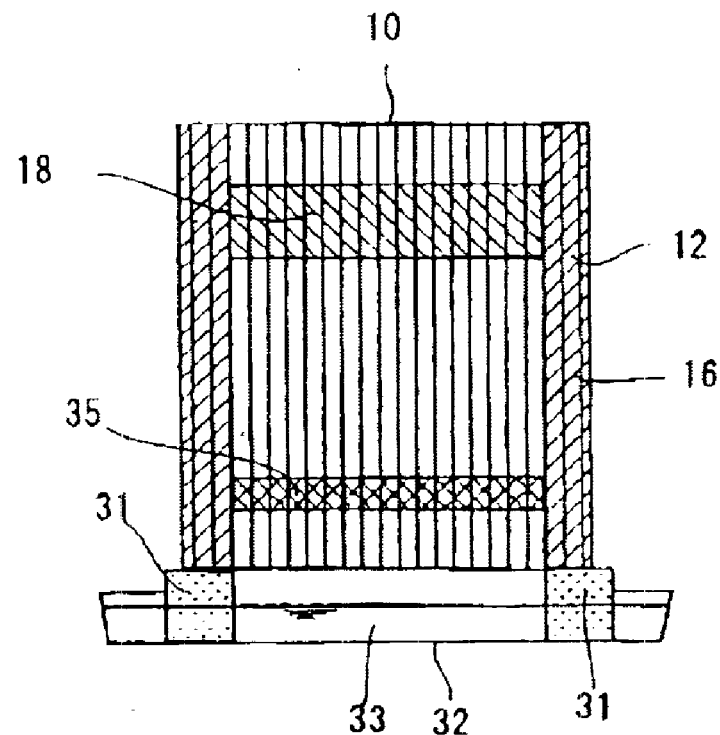
FIGS. 11(a) and 11(b) are illustrations showing a manner of having an adhesive sucked up to a honeycomb body.
Figure 11B:
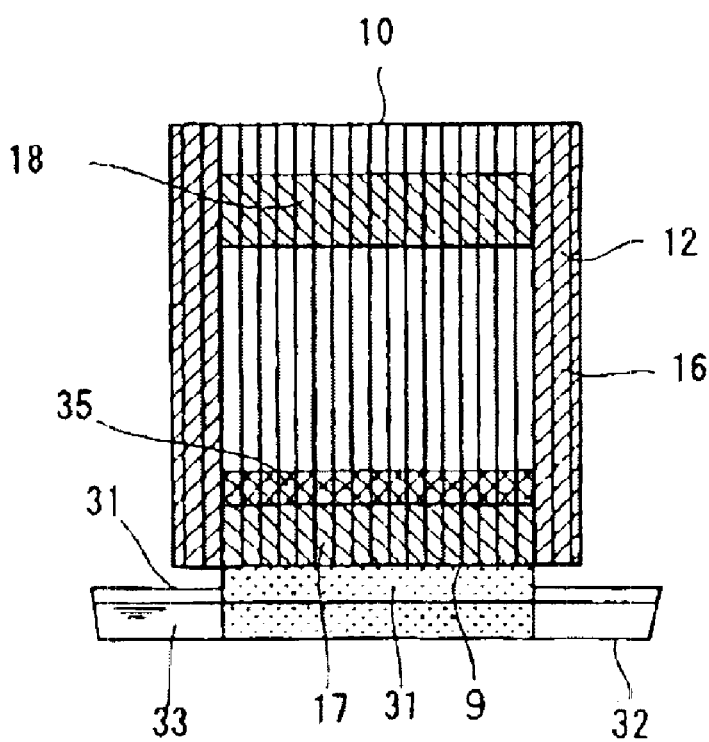

The following sequence of procedures as shown in FIG. 11 is also viable: to apply the adhesive 26 to the areas of the corrugated foil corresponding to the bonding portion 18 inside the honeycomb body over a cross section and apply the fat, grease, oil, etc. to the areas of the flat foil corresponding to the suck-up inhibitor coated zone 35; to wind the flat and corrugated foils into a honeycomb body thereafter; to make one or both end faces of the honeycomb body contact the porous body 31 at the outer layers as shown in FIG. 11(a) to have the adhesive 33 deposited along the bonding portion 16 over the full axial length of the honeycomb body outer layers by the method of sucking up the adhesive 33; and subsequently to make the end face of the honeycomb body contact the porous body 31 at the inner layers as shown in FIG. 11(b) to have the adhesive 33 deposited at the bonding portion 17 at the end of the honeycomb body also by the method of sucking up the adhesive 33.

Figure 12A:
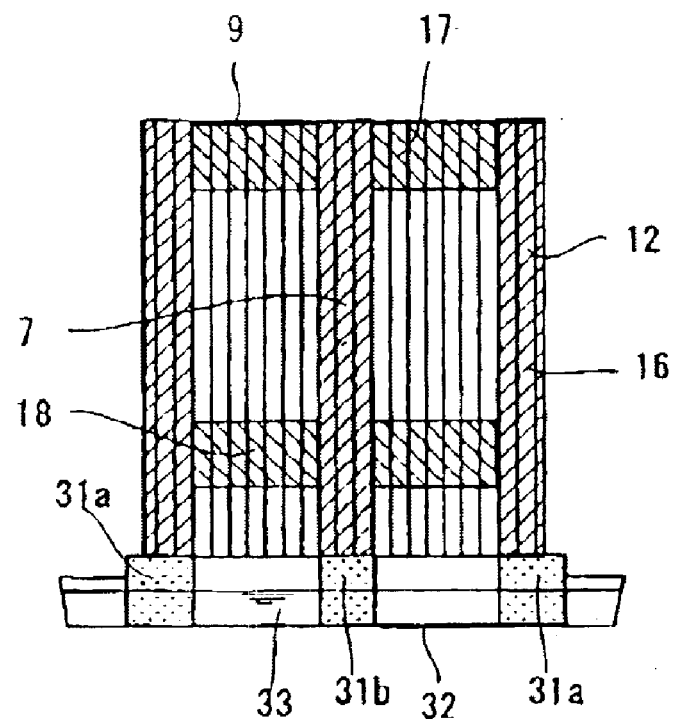
FIGS. 12(a) and 12(b) are illustrations showing a manner of having an adhesive sucked up to a honeycomb body.
Figure 12B:
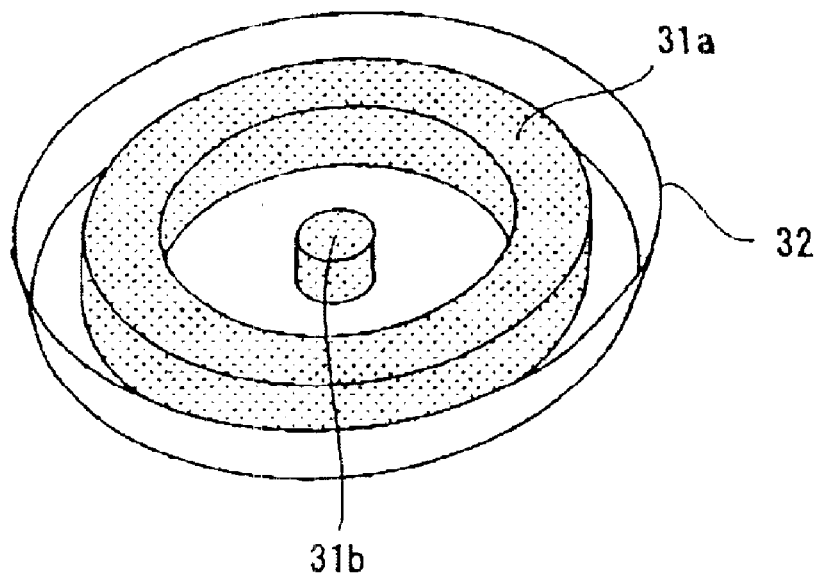

The axial core 7 of the honeycomb body 1, where the winding of the flat foil 3 and the corrugated foil 4 is initiated, sometimes becomes weaker than the other part of the honeycomb body. For this reason, it is preferable to form a bonding portion at the axial core 7 all along the axial length of the honeycomb body as shown in FIG. 12. The adhesive 33 can be sucked up along both the bonding portion 17 in the outer layers and the bonding portion at the axial core 7 at the same time, as shown in FIG. 12(a), by using an annular porous body 31a and a columnar porous body 31b as a porous body as shown in FIG. 12(b).

The present invention is explained hereafter in relation to the item (8) based on FIGS. 13 and 14.

If the adhesive 33 is to be deposited all along the axial length of a honeycomb body 1 having a long axial length by the method of sucking up the adhesive, there may occur a problem that too much of the adhesive 33 is deposited near the end face of the honeycomb body contacting the surface of the liquid adhesive 33 or insufficient adhesive reaches the end of the honeycomb body opposite the end contacting the surface of the liquid adhesive 33. If sound bonding lines are formed by the method of sucking up the adhesive 33 in a part (the gas inlet end portion 20b) of the axial length of the honeycomb body, a sufficiently strong bonding portion can be formed in the bonding portion 20 all along the axial length in the outer layers, even when the method of applying the adhesive 26 has been employed before winding the flat and corrugated foils for the rest (the portion 20a excluding the gas inlet end portion 20b) of the axial length.

With regard to the bonding portion 17 at the gas inlet end of the honeycomb body, on the other hand, for avoiding insufficient or uneven application of the adhesive, it is preferable to employ the method of sucking up the adhesive 33 rather than the method of applying the adhesive 26 before winding the flat and corrugated foils, because the bonding portion 17 is meant to secure the strength of the inner layers of the honeycomb body.

FIG. 13(a) shows the condition before the adhesive 33 is sucked up. Here, before winding the flat foil 3 and the corrugated foil 4 in layers, the adhesive 26 has been applied to the areas corresponding to the bonding portion 18 inside the honeycomb body over a cross section and the portion 20a excluding the portion which is located at the gas inlet end of the honeycomb body from the bonding portion over the full axial length of the honeycomb body outer layers. A suck-up inhibitor coated zone 35 has also been provided near the gas inlet end face 9 of the honeycomb body by applying fat, grease, oil, etc. to the flat foil. Then, the adhesive 33 is deposited along the contact lines 5 of the flat and corrugated foils by making the whole gas inlet end face 9 contact the surface of the liquid adhesive 33 to suck it up as shown in FIG. 13(b). The adhesive 33 is sucked up into the gas inlet side portion 20b of the bonding portion over the full axial length of the honeycomb body outer layers up to the lower end of the portion where the adhesive 26 has been applied and, in the inner layers of the honeycomb body, up to the lower end of the suck-up inhibitor coated zone 35, achieving the condition shown in FIG. 13(b).

The axial length of the gas inlet side portion 20b of the bonding portion over the full axial length of the honeycomb body outer layers can be made longer than the axial length of the bonding portion 17 at the end of the honeycomb body as shown in FIG. 14. By doing so, the bonding portion 20 over the full axial length of the honeycomb body outer layers can be made more sound than in the case shown in FIG. 13.

The inventions according to the items (9) to (12) are applications of the inventions according to the items (2) to (4) and (7) to the invention according to the item (6), and the inventions according to the items (9) to (12) realize the same effects of the inventions according the items (2) to (4) and (7) more efficiently.

Figure 15A:
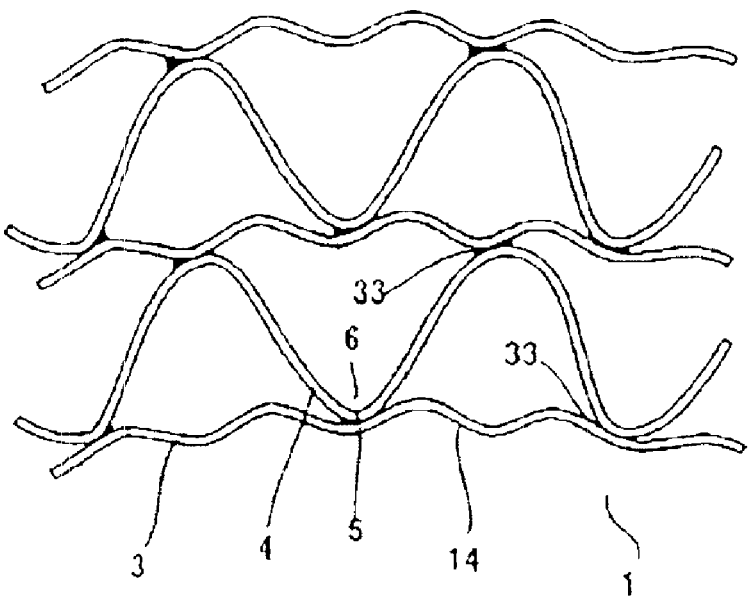
FIG. 15(a) shows a case that the wavelength of the corrugation of a flat foil is smaller than the same of a corrugated foil.
Figure 15B:
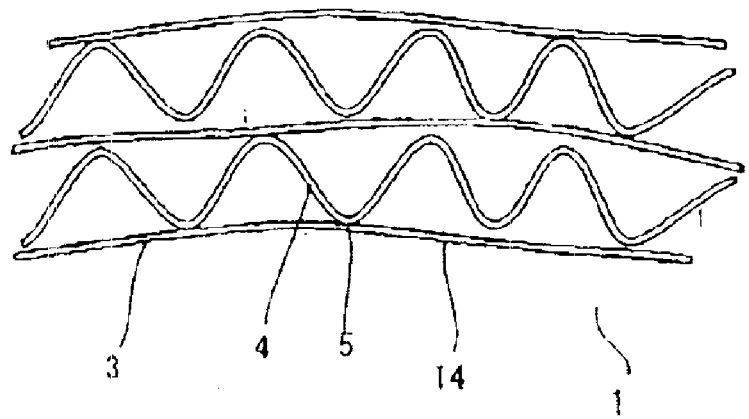
FIG. 15(b) a case that the former is larger than the latter.

As explained before, the reason why the flat foil 3 and the corrugated foil 4 are wound in layers, one over the other, in the present invention is that a cell formed between the corrugated foil in one wavelength and the flat foil by winding the foils in layers is used as a path of the emission gas from a automobile engine. Since the purpose of the winding is to form the cells, it is not imperative that the flat foil 3 should be dead flat as far as the purpose is attained. According to the item (13) of the present invention, the flat foil 3 has corrugation 14 as shown in FIG. 15. Here, the wavelength of the corrugation 14 of the flat foil 3 is shorter than that of the corrugated foil 4 and the wave height of the corrugation 14 of the flat foil 3 is also smaller than that of the corrugated foil 4. As a result, the formation of the cells, or the paths of the emission gas, by winding the flat foil 3 and corrugated foil 4 in layers is not different from the case of winding a flat toil having no corrugation with a corrugated foil. The wavelength of the corrugation 14 of the flat foil 3 may either be shorter than that of the corrugated foil 4 as shown in FIG. 15(a) or longer than the same as shown in FIG. 15(b). It is preferable for forming a honeycomb body having good cell shapes that the wavelength of the corrugation 14 of the flat foil 3 is 85% or less of the same of the corrugated foil 4 and that the wave height of the corrugation 14 of the flat foil 3 is 50% or less of the same of the corrugated foil 4. The use of a flat foil 3 having the corrugation 14 specified above increases elasticity of the flat foil 3 and improves the service life of the honeycomb body.

INDUSTRIAL APPLICABILITY

A honeycomb body for metal catalyst support use manufactured by a method according to the present invention has high structural reliability against thermal load and stress imposed on a catalyst support and resistance against the fracture problem caused by a misfire of a automobile engine, as a result of bonding the foils over the full axial length of the honeycomb body outer layers and at one or both ends of the honeycomb body inner layers and/or at another portion of the honeycomb body inner layers which is located inside the honeycomb body over a cross section.

The present invention eliminates poor bonding and excessive consumption of the brazing filler metal and realizes excellent bonding of the foils, compared with the methods to apply the adhesive 26 to a flat or corrugated foil using rolls, because the adhesive is deposited by a method of sucking it up after the flat and corrugated foils are wound in layers; at the bonding portion 16 over the full axial length of the honeycomb body outer layers according to the items (1) to (7) of the present invention and at the bonding portion 17 which is located at the gas inlet end of the honeycomb body according to the item (8) of the present invention. By the present invention, it is possible to evenly deposit the adhesive along the contact lines of the foils and evenly braze the bonding portion over the full axial length even when the corrugated foil is bent in its width direction.

By the present invention, the equipment cost of the honeycomb body manufacturing facilities can be lowered, because the application of an adhesive by rolls can be limited only to the bonding portion at one or both ends of the honeycomb body and/or the bonding portion inside the honeycomb body over a cross section which is located away from one or both ends thereof in the axial direction.

Since the present invention employs also a method of applying the adhesive by rolls, it is possible to apply the adhesive selectively to the areas of a foil corresponding to a bonding portion inside a honeycomb body over a cross section and, therefore, it is possible to manufacture a honeycomb body conforming to the countermeasure against an engine misfire problem.

What is claimed is:

1. A method of manufacturing a honeycomb body formed by winding a flat metal foil and a corrugated metal foil in layers and brazing them at the bonding portion over the full axial length of the honeycomb body outer layers, at a bonding portion which is located at one or both ends of the honeycomb body, and/or at a bonding portion inside the honeycomb body over a cross section which is located away from one or both ends thereof in the axial direction, characterized by:
   (a) prior to winding the flat and corrugated foils in layers to form the honeycomb body, applying an adhesive to the portions to be brazed of the flat or corrugated foil corresponding to the bonding portion which is located at one or both ends of the honeycomb body and/or the bonding portion inside the honeycomb body over a cross section which is located away from one or both ends thereof in the axial direction;
   (b) then, winding the flat and corrugated foils in layers to form the honeycomb body;
   (c) then, after winding the flat and corrugated foils in layers to form the honeycomb body, depositing a liquid adhesive at the portion of the honeycomb body corresponding to the bonding portion over the full axial length of the honeycomb body outer layers by making the portion of one or both end faces of the honeycomb body corresponding to the bonding portion over the full axial length of the honeycomb body outer layers contact the surface of the liquid adhesive and having the adhesive sucked up along contact lines of the flat and corrugated foils; and
   (d) then, feeding a brazing filler metal in powder to the honeycomb body so as to have it deposited at the portions where the adhesives have been applied or deposited.

2. A method of manufacturing a honeycomb body according to claim 1, characterized in that the bonding portion over the full axial length of the honeycomb body outer layers covers ⅓ or less of the radius of the honeycomb body from its outermost layer toward the center thereof.

3. A method of manufacturing a honeycomb body according to claim 1, characterized in that the portions of the flat foil or the corrugated foil to which the adhesive is applied are the portions corresponding to the wave tops of the corrugated foil.

4. A method of manufacturing a honeycomb body according to claim 1, characterized by applying the adhesive to the portions of the flat foil or the corrugated foil by making rolls covered with the adhesive on the surfaces contact the flat or corrugated foil.

5. A method of manufacturing a honeycomb body according to claim 1, characterized by depositing the liquid adhesive at the portion of the honeycomb body corresponding to the bonding portion over the full axial length of the honeycomb body outer layers by making a porous body impregnated with the liquid adhesive contact the portion of one or both end faces of the honeycomb body corresponding to the bonding portion over the full axial length of the honeycomb body outer layers and, thus, having the adhesive sucked up along the contact lines of the flat and corrugated foils.

6. A method of manufacturing a honeycomb body according to claim 5, characterized in that the porous body has an annular shape.

7. A method of manufacturing a honeycomb body according to claim 4, characterized in that the viscosity of the liquid adhesive to be sucked up to the honeycomb body is lower than that of the adhesive to be applied by the rolls.

8. A method of manufacturing a honeycomb body formed by winding a flat metal foil and a corrugated metal foil in layers and brazing them at the bonding portion over the full axial length of the honeycomb body outer layers, at a bonding portion which is located at one or both ends of the honeycomb body, and/or at a bonding portion inside the honeycomb body over a cross section which is located away from one or both ends thereof in the axial direction, characterized by:
   (a) prior to winding the flat and corrugated foils in layers to form the honeycomb body, applying an adhesive to the portions to be brazed of the flat or corrugated foil corresponding to the bonding portion inside the honeycomb body over a cross section which is located away from one or both ends thereof in the axial direction and to the portion excluding the portion which is located at the gas inlet end of the honeycomb body from the bonding portion over the full axial length of the honeycomb body outer layers;
   (b) then, winding the flat foil and the corrugated foil in layers to form the honeycomb body;
   (c) then, after winding the flat and corrugated foils in layers to form the honeycomb body, depositing a liquid adhesive at the portion which is located at the gas inlet end out of the bonding portion over the full axial length of the honeycomb body outer layers and the bonding portion which is located at one or both ends of the honeycomb body, by making the gas inlet end face of the honeycomb body adhere to the surface of the liquid adhesive and having the adhesive sucked up along contact lines of the flat and corrugated foils; and
   (d) then, feeding a brazing filler metal in powder to the honeycomb body so as to have it deposited at the portions where the adhesives have been applied or deposited.

9. A method of manufacturing a honeycomb body according to claim 8, characterized in that the bonding portion over the full axial length of the honeycomb body outer layers covers ⅓ or less of the radius of the honeycomb body from its outermost layer toward the center.

10. A method of manufacturing a honeycomb body according to claim 8, characterized in that the portions of the flat foil or the corrugated foil to which the adhesive is applied are the portions corresponding to the wave tops of the corrugated foil.

11. A method of manufacturing a honeycomb body according to claim 8, characterized by applying the adhesive to the portions of the flat foil or the corrugated foil by making rolls covered with the adhesive on the surface contact the flat or corrugated foil.

12. A method of manufacturing a honeycomb body according to claim 11, characterized in that the viscosity of the liquid adhesive to be sucked up to the honeycomb body is lower than that of the adhesive to be applied by the rolls.

13. A method of manufacturing a honeycomb body according to claim 1, characterized in that the flat foil has corrugation and the wave height of the corrugation is smaller than the wave height of the corrugated foil.

14. A method of manufacturing a honeycomb body according to claim 8, characterized in that the flat foil has corrugation and the wave height of the corrugation is smaller than the wave height of the corrugated foil.

* * * * *